United States Patent
Simonsen et al.

(10) Patent No.: US 12,344,766 B2
(45) Date of Patent: Jul. 1, 2025

(54) COATINGS

(71) Applicant: JOTUN A/S, Sandefjord (NO)

(72) Inventors: Marianne C. Simonsen, Sandefjord (NO); Celine Abadie, Cliffe Yorkshire (GB)

(73) Assignee: JOTUN A/S, Sandefjord (NO)

( * ) Notice: Subject to any disclaimer, the term of this patent is extended or adjusted under 35 U.S.C. 154(b) by 0 days.

(21) Appl. No.: 18/253,897

(22) PCT Filed: Dec. 3, 2021

(86) PCT No.: PCT/EP2021/084280
§ 371 (c)(1),
(2) Date: May 22, 2023

(87) PCT Pub. No.: WO2022/117878
PCT Pub. Date: Jun. 9, 2022

(65) Prior Publication Data
US 2024/0002681 A1    Jan. 4, 2024

(30) Foreign Application Priority Data
Dec. 4, 2020    (EP) .................................... 20212013

(51) Int. Cl.
*C09D 5/18* (2006.01)
*B05D 7/00* (2006.01)
*C09D 5/00* (2006.01)
*C09D 7/61* (2018.01)
*C09D 7/63* (2018.01)
*C09D 163/00* (2006.01)

(52) U.S. Cl.
CPC ............. *C09D 5/185* (2013.01); *B05D 7/584* (2013.01); *C09D 5/002* (2013.01); *C09D 7/61* (2018.01); *C09D 7/63* (2018.01); *C09D 163/00* (2013.01); *B05D 2502/00* (2013.01); *B05D 2503/00* (2013.01); *B05D 2518/10* (2013.01)

(58) Field of Classification Search
CPC . C09D 5/185; C09D 7/61; C09D 7/63; C09D 5/002; C09D 163/00; B05D 7/584
See application file for complete search history.

(56) References Cited

U.S. PATENT DOCUMENTS

2019/0315911 A1* 10/2019 Lau .................. C09K 21/02

FOREIGN PATENT DOCUMENTS

| CN | 103045047 A1 | 4/2013 |
| CN | 102 492 323 B | 3/2014 |
| CN | 102492323 * | 3/2014 |
| CN | 106905818 A | 6/2017 |
| CN | 108 912 945 A | 11/2018 |
| CN | 110191928 A | 8/2019 |
| EP | 3 366 729 A1 | 8/2018 |
| GB | 2071111 A | 9/1981 |
| WO | 2018087315 A1 | 5/2018 |

OTHER PUBLICATIONS

I'ntl Search Report and Written Opinion of PCT/EP2021/084280 mailed on Feb. 3, 2022.
Mariappan Thirumal et al: "An investigation of primer adhesion and topcoat compatibility on the waterborne intumescent coating to structural steel", Progress in Organic Coatings, vol. 131, Jun. 1, 2019 (Jun. 1, 2019), pp. 371-377, XP055894321, NL ISSN: 0300-9440, DOI: 10.1016/j.porgcoat.2019.03.003 abstract.

* cited by examiner

*Primary Examiner* — Nathan T Leong
(74) *Attorney, Agent, or Firm* — Thomas | Horstemeyer, LLP

(57) ABSTRACT

A process for the application of an intumescent coating system to a substrate comprising (I) applying to a substrate an intumescent coating composition comprising i. an epoxy-based binder; ii. a curing agent; iii. an expansion agent; iv. an acid generating compound; and v. at least 5 wt. % water; and allowing said composition to cure to form an intumescent coating layer; (II) applying to a cured or partially cured intumescent coating layer, a top coat composition comprising an acrylic-based binder, a polyurethane binder or a silicone-based binder and at least 10 wt. % water so as to form a top coat layer.

10 Claims, No Drawings

COATINGS

This application is a 35 U.S.C. § 371 national stage application of PCT international application number PCT/EP2021/084280, filed on Dec. 3, 2021, which claims priority to European patent application number 20212013.5, filed on Dec. 4, 2020, which are both incorporated herein by reference in their entireties.

This invention relates to an intumescent coating system comprising an intumescent coating layer comprising an epoxy binder and a curing agent for the binder and a top coat layer comprising acrylic-based binder, a polyurethane binder or a silicone-based binder obtained from waterborne starting materials. The invention also relates to a process for the preparation of such an intumescent coating system.

The intumescent coating system has an excellent durability whilst maintaining suitable char forming and insulation properties required of a intumescent coating system. The invention also relates to a process for the application of such an intumescent coating system to a substrate. The invention also relates to substrates coated with a cured intumescent coating system.

BACKGROUND OF INVENTION

In order to protect substrates from fire, it is well known to protect substrates with an intumescent coating. Waterborne intumescent coatings are an eco-friendly alternative to solvent borne intumescent coatings. The benefit of having a waterborne intumescent coating composition instead of a solvent borne intumescent coating composition is that water can be used as a solvent during spray application and as a cleaning solvent. This is a benefit both from an environmental and health and safety perspective.

Solvent free intumescent coatings are also known but are often challenging to apply due to their viscosity.

Intumescent coatings are sometimes applied as part of a coating system comprising an intumescent coating layer and a top coat layer. The substrate may also be protected by a primer layer underneath the intumescent coating layer. There is reduced value designing a waterborne intumescent coating unless the top coat layer is also applied with water. It is desirable from an environmental and health and safety perspective that both layers are made from waterborne coating compositions.

Commercially available waterborne intumescent coatings are usually based on vinyl acetate-based binders. There is a general challenge in the coatings industry that there is an incompatibility between the waterborne intumescent coating layer and the waterborne top coat. This leads to separation of the wet waterborne top coat film from the layers beneath and formation of cracks in the dry film. To avoid this problem, a solvent borne top coat is often used instead.

The inventors have surprisingly found that if a waterborne intumescent coating based on an epoxy-based binder is used there is no incompatibility with a specific waterborne top coat layer. It is then possible to prepare an intumescent coating system wherein both the intumescent layer and the top coat layer are formed from waterborne coating compositions.

Moreover, we have surprisingly found that an epoxy-based waterborne intumescent coating has several other advantages over waterborne intumescent coatings based on vinyl acetate-based binders such as improved mechanical strength and improved outdoor durability.

Waterborne intumescent epoxy coatings are known. EP-A-3339385 describes a waterborne epoxy coating for overcoating an inorganic fire protection layer. The epoxy resin can be a bisphenol A or F resin optionally with a reactive diluent. There is no mention of the use of such a coating in conjunction with a waterborne topcoat.

US20190315911 describes an intumescent coating system comprising at least a fire-retardant layer and an intumescent layer. Optionally an anti-weathering composition can be applied on the intumescent composition. The anti-weathering composition is vinyl-polysiloxane. The fire retardant layer and the intumescent layer comprise epoxy-binders and water however the anti-weathering composition does not comprise any water.

CN 102492323 describes a fireproof coating system with an overall lower coating thickness, better fire performance and that also has a good decorative effect. The middle intumescent coating layer therein is based on melamine-formaldehyde and is epoxy free.

There is a general problem in the industry with the compatibility between a waterborne intumescent coating and a waterborne top coat.

SUMMARY OF INVENTION

Thus, viewed from one aspect the invention provides a process for the application of an intumescent coating system to a substrate comprising
  (I) applying to a substrate an intumescent coating composition comprising
    i. an epoxy-based binder;
    ii. a curing agent;
    iii. an expansion agent;
    iv. an acid generating compound; and
    v. at least 5 wt. % water;
  and allowing said composition to cure to form an intumescent coating layer;
  (II) applying to a cured or partially cured intumescent coating layer, a top coat composition comprising an acrylic-based binder, a polyurethane binder or a silicone-based binder and at least 10 wt. % water so as to form a top coat layer.

Viewed from another aspect the invention provides an intumescent coating system obtainable by a process as hereinbefore defined. Such an intumescent coating system may comprise:
  B) an intumescent coating layer;
  C) a top coat layer;
  wherein the intumescent coating layer comprises
  i. an epoxy-based binder;
  ii. a curing agent;
  iii. an expansion agent; and
  iv. an acid generating compound;
  wherein the top coat layer comprises an acrylic-based binder, a polyurethane binder or a silicone-based binder.

Viewed from another aspect the invention provides a process for the application of an intumescent coating system to a substrate comprising
  (I) applying to a substrate a primer layer comprising an epoxy-based binder or a vinyl-based binder to form a primer layer on said substrate;
  (II) applying to said primer layer an intumescent coating composition comprising
    i. an epoxy-based binder;
    ii. a curing agent;
    iii. an expansion agent;
    iv. an acid generating compound; and
    v. at least 5 wt. % water;

and allowing said composition to cure to form an intumescent coating layer;

(III) applying to a cured or partially cured intumescent coating layer, a top coat composition comprising an acrylic-based binder, a polyurethane binder or a silicone-based binder and at least 10 wt. % water so as to form a top coat layer.

Viewed from another aspect the invention provides an intumescent coating system comprising an intumescent coating system comprising
A) a primer layer;
B) an intumescent coating layer;
C) a top coat layer;
wherein the primer layer comprises an epoxy-based binder or a vinyl-based binder;
wherein the intumescent coating layer comprises
i. an epoxy-based binder;
ii. a curing agent;
iii. an expansion agent; and
iv. an acid generating compound;
wherein the top coat layer comprises an acrylic-based binder, a polyurethane binder or a silicone-based binder.

In one embodiment the intumescent coating layer comprises the cured product of the components thereof.

Viewed from another aspect the invention provides a substrate coated with an intumescent coating system as herein before defined.

Viewed from another aspect the invention provides a substrate coated with an intumescent coating system as herein before defined which has been cured.

Viewed from another aspect the invention provides use of an intumescent coating system as hereinbefore defined to coat a substrate.

In one embodiment the substrate to which the intumescent coating composition is applied caries a primer layer.

Definitions

The invention relates to an intumescent coating system. The term intumescent coating system defines a multilayer coating comprising at least an intumescent coating layer and a top coat layer directly thereon. There may also be at least one primer layer directly underneath the intumescent coating layer. The intumescent coating system of the invention may therefore comprise 2 or 3 layers or more. It may be that to develop a suitable film thickness multiple coats are required of a particular composition. We regard the application of multiple coats of the same composition as forming a single layer in the intumescent coating system.

The term intumescent coating composition defines the composition used to prepare the intumescent coating layer. Such an intumescent coating composition may itself be formed from the combination of the first composition (A) and the second composition (B) as further defined below. To prevent premature curing, the intumescent coating composition may be supplied in two parts, a first composition (A) comprising the epoxy binder and a second composition (B) comprising the curing agent. The other components of the intumescent coating composition can be present in either component (A) or (B) as long as any component present in component (A) does not react with any other component within component (A) and any component present in component (B) does not react with any other component within component (B).

The intumescent coating composition comprises a binder system defined as the combination of the binder resin(s), and the curing agent. If present, the reactive diluent and the flame retardant are also regarded as part of the binder system.

The intumescent coating composition also contains components to ensure intumescence. To "intumesce" means to char and expand. When exposed to heat from a fire, for example, components in an intumescent coating chemically react to produce gases and a cellular carbonaceous char that expands into a foam when the gases become trapped within the char. Intumescent coatings thus form a relatively thick and thermally insulative foam barrier on the surfaces of coated substrates exposed to fire and/or relatively high heat.

The term expansion agent is used interchangeably with the term blowing agent.

The term acid generating compound might also be called acid catalyst herein.

The term (meth) acrylate encompasses both methacrylate and acrylate.

The term top coating composition defines the composition used to prepare the top coating layer.

DETAILED DESCRIPTION OF INVENTION

This invention relates to an intumescent coating system for a substrate such as a metal substrate, a composite material, or cellulosic substrate preferably a steel substrate. That substrate can be present on any object on which the coating of the invention might be useful.

The substrate may be in structures such as residential housing, hotels, shopping malls, museums, airports, commercial offices and the like.

The substrate may be provided with a conventional anti-corrosive primer coating to which the intumescent coating layer adheres. Examples of suitable primer layers are coatings based on epoxy, modified epoxy (such as modified with polyvinyl butyral), polyurethane, acrylic, vinyl and chlorinated rubber. Preferably the primer layer is an epoxy-based primer or a zinc-rich epoxy-based primer. The dry film thickness of the primer is ideally in the range of 15 to 500 microns.

The intumescent coating composition may also be applied directly onto a substrate, e.g. direct to metal.

The intumescent coating layer is overcoated with a top coat layer. The top coat layer may provide a desired colour to the substrate and enhance the durability of the intumescent coating system. A clear top-coat may also be suitable.

The top coat layer used may comprise an acrylic-based binder, a polyurethane binder or a silicone-based binder. Preferably the top coat layer comprises an acrylic-based binder. The thickness of the top coat layer can vary from 15 microns to 250 microns. Preferably the thickness should be in the range from 25 microns to 75 microns, as too high a thickness of top coat layer may inhibit intumescent reactions. The top coating composition may be applied in several applications to achieve the appropriate dry film thickness The intumescent coating composition is applied in high dry film thickness to ensure a good fire protection. The dry film thickness of the intumescent coating layer is preferably 0.1 to 8.0 mm. The intumescent coating composition may be applied in several applications to achieve the appropriate dry film thickness.

The intumescent coating layer is designed to protect substrates to critical core temperatures ranging from 200-700° C. depending on the nature of the substrate, degree of load and particular requirements of the specific structure being protected. The critical core temperature is typically defined as the temperature when a specific substrate has lost load bearing capacity to such a degree that the structure is at immediate risk of a critical collapse.

Intumescent Coating Composition

The intumescent coating layer is prepared through the application of an intumescent coating composition to the substrate. The intumescent coating composition comprises a binder system based on at least one epoxy binder, which is cured using at least one curing agent. The intumescent coating composition also comprises intumescent components and may comprise conventional intumescent coating components such as pigments, fillers and standard additives. It must be waterborne.

The intumescent coating composition preferably comprises a component (A) comprising at least one epoxy binder; and a component (B) comprising at least one curing agent.

A combination of epoxy binders is also possible. The intumescent coating composition is typically supplied in kit form and shortly before application of the intumescent coating composition to a substrate, a first composition comprising the epoxy binder is mixed with a second composition comprising the curing agent to form the intumescent coating composition. After application, that intumescent coating composition then cures on the substrate to form an intumescent coating layer.

In one embodiment, the binder system of the intumescent coating composition comprises at least one liquid epoxy binder. The term liquid refers to the state of the epoxy binder at room temperature and pressure of 23° C., 1 atm.

Preferably the intumescent coating composition is free of any organic solvents and thereby has a low content of volatile organic compounds (VOC).

The intumescent coating composition of the invention preferably contains a very low organic solvent content such as less than 1.0 wt % organic solvent, especially less than 0.5 wt % organic solvent, more especially free of organic solvent. Ideally there is no organic solvent present at all in the intumescent coating composition.

The intumescent coating composition of the invention must however be waterborne. Preferably, the intumescent coating composition has a volume solids content of at least 50%, such as at least 55%, e.g. 55 to 60%.

The intumescent coating composition of the invention may comprise at least 5 wt % water such as at least 8 wt % water, e.g. 10 to 50 wt % water, such as 10 to 30 wt % water.

The VOC content of the intumescent coating composition is preferably less than 100 g/L, more preferably less than 50 g/L, most preferably less than 25 g/L. In some embodiments, the VOC content might be 10 g/L or less. In this regard, volatile organic compounds include benzyl alcohol.

The pot life of the intumescent coating composition of the invention is preferably at least 1 hr, such as 1 to 3 hrs, e.g. 1.5 to 2.5 hrs. By pot life is meant the time after mixing of the first and second components when the intumescent coating composition is still able to be applied to the substrate. Pot lives of less than 30 mins are commercially challenging given the time it takes to coat a large object.

The viscosity of the intumescent coating composition measured just after combination of the two components should be high to ensure the application of thick layers with high amounts of intumescent pigments to ensure good fire protection.

Viscosities may be in the range of 10,000 to 100,000 cP at 23° C. measured on a Brookfield DV-II with spindle 6 at 10 rpm, for both A and B component. The intumescent coating system of the invention is most especially associated with retained outdoor durability without any reduction in the passive fire protection performance in the context of a water borne system.

The intumescent coating composition of the invention adheres well to both the substrate or a primer layer on that substrate and the top coat layer.

The components of the intumescent coating composition will now be described in more detail. These components can be present in any component of a kit used to make the intumescent coating composition as long as the curing agent is kept separate from any other component of the intumescent coating composition with which it would react in storage.

Intumescent Components of the Coating Composition

Intumescent coating compositions of the invention comprise a binder system (comprising at least an epoxy binder and a curing agent) and intumescent coatings components. These include an acid-generating agent which typically thermally decomposes at elevated temperatures (e.g. greater than 200° C.) and produces an acid that reacts with a carbon donor compound to produce a carbonaceous char. The intumescent components also include an expansion agent that decomposes at elevated temperatures (e.g. greater than 200° C.) and produces a gas that volumetrically expands the carbonaceous char and produces a carbonaceous foam.

Intumescent coating compositions of the invention can comprise a specific carbon donor compound which functions as a charring agent.

In a preferred embodiment, the intumescent coating composition comprises a specific carbon donor compound as specified below. The binder system comprising at least an epoxy binder and a curing agent can also provide a source of carbon, which, in a fire, is converted into a char.

When intumescent coatings are exposed to fire or heat, and, as a result, the temperature of the intumescent coatings exceeds 200° C., for example, the acid-generating agent decomposes to provide an acid. The carbon donor compound reacts with the acid to form a carbonaceous char. For example, an ammonium polyphosphate acid-generating agent decomposes at about 240° C. to form ammonia and phosphoric acid. The phosphoric acid can function as an acid for dehydration reactions of organic polyol compounds such as starch, cellulose, non-polymeric sugars (e.g., glucose, fructose, sucrose, and the like), pentaerythritol, dipentaerythritol, or tripentaerythritol, or combinations of any thereof, which function as carbon donor compounds.

The phosphoric acid reacts with the hydroxyl groups to form heat-unstable phosphate esters, which decompose to release carbon dioxide and regenerate the phosphoric acid. The dehydrated carbon donor and/or the binder system forms the carbonaceous char, and the carbon dioxide expands the char into a foam.

The expansion agent likewise decomposes at elevated temperatures (e.g., greater than 200° C.) and produces additional gas that volumetrically expands the carbonaceous char and produces the carbonaceous foam.

It is therefore preferred if the intumescent coating composition of the invention comprises an acid-generating agent, an expansion agent and optionally a carbon donor compound.

Carbon Donor Compound

The carbon donor compound, if present, can comprise an organic polyhydroxy compound (i.e. an organic polyol) and/or expandable graphite. For example, the carbon donor compound can comprise pentaerythritol, dipentaerythritol, tripentaerythritol, a polysaccharide (e.g., starch, cellulose, glycogen, and the like), a disaccharide sugar (e.g., sucrose, lactose, maltose, and the like), a monosaccharide sugar (glucose, fructose, galactose, and the like), glycerol, or expandable graphite, or a combination of any thereof. Preferably the carbon donor is pentaerythritol or dipentaerythritol.

Acid Generating Compound

The acid-generating compound can comprise a source of phosphoric or sulfonic acid that is capable of producing the phosphoric or sulfonic acid upon exposure to heat, particularly at temperatures greater than 200° C. Examples of such sources include sodium phosphate, potassium phosphate (e.g. potassium tripolyphosphate), ammonium phosphate (e.g. ammonium polyphosphate (APP), monoammonium phosphate, diammonium phosphate), sodium sulfate, potassium sulfate, ammonium sulfate, magnesium sulfate, or para-toluene sulfonic acid, or a combination of any thereof.

In some examples, the acid-generating compound comprises a phosphoric acid ester of a polyhydroxy compound, or an ammonium phosphate (e.g., APP), or an amine phosphate (e.g., melamine phosphate), or a combination of any thereof.

A particularly useful acid-generating compound is ammonium polyphosphate because APP yields phosphoric acid at temperatures generally below the decomposition temperatures of the carbon donor compounds described above. Thus, APP produces phosphoric acid that is readily available to participate in the charring reactions.

APP compounds are polymeric phosphates, having PD—O—P linkages, which may be represented by the formula:

wherein the average value of n is at least about 10. Particularly useful APP compounds in the intumescent coating compositions of the present invention include those having values of n>1000.

The acid-generating compound can also comprise boric acid or a source of boric acid that is capable of producing boric acid upon exposure to heat, particularly at temperatures greater than 200° C. The source of boric acid can comprise, for example, borate salts such as ammonium pentaborate, zinc borate, sodium borate, lithium borate, aluminum borate, magnesium borate, borosilicate compounds, and combinations of any thereof.

Expansion Agent

The intumescent coating composition of the present invention may further comprise an expandable intumescent material (also known as a blowing agent). The blowing agent will produce non-flammable gases, generally nitrogen, when exposed to fire or heat. The produced gases will expand the char derived from the carbon source, forming a foam-like protective layer. Suitable examples of commercially available blowing agents include but are not limited to nitrogen-containing compounds such as glycine, melamine, melamine salts, melamine derivatives, urea, urea derivatives, dicyandiamide, guanidine, and isocyanurate derivatives, especially melamine.

Melamine derivatives include for example melamine formaldehyde, methylolated melamine, hexamethoxymethylmelamine, melamine monophosphate, di-melamine phosphate, melamine biphosphate, melamine polyphosphate, melamine pyrophosphate, melamine cyanurate, melamine borate, melam (N2-(4,6-diamino-1,3,5-triazin-2-yl)-1,3,5-triazine-2,4,6-triamine), melem (2,5,8-triamino-1,3,4,6,7,9,9b-heptaazaphenalene), and melon (poly[8-amino-1,3,4,6,7,9,9b-heptaazaphenalene-2,5-diyl)imino).

Urea derivatives include, for example, N-alkylureas such as methyl urea; N,N'-dialkylureas such as dimethylurea; and N,N,N'-trialkylureas such as timethylurea; guanylurea; guanylurea phosphate; formamide amino urea; guanylurea phosphate; 1,3-diamino urea; biurea; and the like.

Isocyanurate derivatives of interest include tris-(2-hydroxyethyl)isocyanurate (THEIC).

Boron-containing compounds useful as blowing agents in the present invention include, but are not limited to, boric acid, and borates, such as ammonium pentaborate, zinc borate, sodium borate, lithium borate, aluminum borate, magnesium borate, and borosilicate.

The blowing agent may also comprise monomeric or polymeric compounds such as meso-lactide, polylactide, a polysulfone, a polycarbonate, a polyester, a 1,1-di-activated vinyl compound, or an addition polymer of a 1,1-di-activated vinyl compound, or a combination of any thereof.

A physical blowing agent such as expandable graphite and/or gas incorporating expandable microspheres may also be used.

It is therefore preferred if the intumescent coating composition comprises
  i. an epoxy-based binder;
  ii. a curing agent;
  iii. an expansion agent;
  iv. an acid generating compound;
  v. a carbon donor compound; and
  vi. at least 5 wt % water.

It is further preferred if the intumescent coating composition comprises
  i. an epoxy-based binder;
  ii. a curing agent;
  iii. an expansion agent which comprises melamine;
  iv. an acid generating compound which comprises ammonium polyphosphate;
  v. a carbon donor compound; and
  vi. at least 5 wt % water.

The intumescent coating composition can comprise 0.0 to 20 wt % of the carbon donor compound, such as 3.0 to 20 wt %, preferably 5.0 to 16 wt %, especially 7.0 to 14 wt % of the carbon donor compound based on the total dry weight of the intumescent coating composition.

The intumescent coating composition can comprise 10 to 50 wt % of an acid-generating agent, preferably 12 to 40 wt %, more especially 15 to 30 wt % based on the total dry weight of the intumescent coating composition.

The intumescent coating composition can comprise 3.0 to 20 wt %, of the expansion agent, preferably 5.0 to 16 wt %, especially 7.0 to 14 wt % based on the total dry weight of the intumescent coating composition.

Epoxy-Based Binder System

The epoxy-based binder system comprises the combination of one or more epoxy-based binders, one or more curing agents, and optionally reactive diluents, co-binders, flame retardant and accelerators.

Epoxy-Based Binder

The epoxy-based binder system preferably comprises one or more epoxy-based binders selected from aromatic or aliphatic epoxy-based binders preferably comprising more than one epoxy group per molecule. The epoxy-groups may be in an internal or terminal position on the epoxy-based binder or on a cyclic structure incorporated into the epoxy-based binder. Preferably the epoxy-based binder comprises at least two epoxy groups so that a crosslinked network can be formed.

It should be understood that the epoxy-based binders of the present invention also encompass binders that have the traditional epoxy backbones but where the epoxy end-groups have been modified with acrylic or methacrylic functional groups that can be cured with the same curing agents as the epoxy-groups.

Suitable aliphatic epoxy-based binders include epoxy and modified epoxy binders selected from cycloaliphatic epoxy such as hydrogenated bisphenol A, hydrogenated bisphenol A novolac and dicyclopentadiene based binders, glycidyl ethers such as polyglycidyl ethers of polyhydric alcohols, epoxy functional acrylic resins or any combinations thereof.

Suitable aromatic epoxy-based binders includes epoxy and modified epoxy binders selected from bisphenol type epoxy-based binders such as bisphenol A, bisphenol F and bisphenol S, resorcinol diglycidyl ether (RDGE), novolac type epoxy-based binders such as phenolic novolac type binders (bisphenol A novolac, bisphenol S novolac) and cresol novolac type binder or any combinations thereof.

In one preferred embodiment the epoxy-based binder is an aromatic epoxy-based binder. Preferably, the aromatic epoxy-based binder is derived from a combination of a compound comprising a least one epoxide functionality with an aromatic co-reactant comprising at least two hydroxyl groups.

Preferred epoxy binders are bisphenol epoxy binders. Preferred epoxy-based binders are biphenol A and bisphenol F epoxy-based binders or bisphenol A/F epoxy binders. In one particularly preferred embodiment the epoxy-based binder is a bisphenol A epoxy-based binder.

The epoxy-based binder may be a modified epoxy-based binder. Preferably the epoxy-based binder is modified with fatty acids, polypropylene oxide and/or polyethylene oxide.

The solids content of the epoxy-based binder is preferably more the 90 wt %, more preferred more than 95 wt %, most preferred more than 98 wt %.

The epoxy-based binder may also be dispersed or emulsified in water. Appropriate chemical modifications may be performed on the binder to improve water compatibility. The water-based dispersions or emulsions comprising the epoxy-based binder preferably also comprise surfactants such as polyethers. In addition, further components such as emulsifiers, stabilizers, defoamers, dispersing agents and biocides may be present.

The water-based dispersions or emulsions comprising the epoxy-based binder preferably have a solid content of 20-60 wt. %, more preferably 40-60 wt. %, most preferred 50-60 wt. %.

Examples of suitable commercially available epoxy-based binders are:
  Bisphenol A type epoxy-based binders: Epikote 828 from Hexion, Araldite GY 776 from Huntsman Advanced Materials,
  Bisphenol F epoxy-based binders: Epikote 862 from Hexion, YDF-170 from Kukdo, GY285 from Huntsman, DE 354 from Dow, BFE-170 from CCP, or KF8100 from Kolon.
  Mixture of bisphenol A and bisphenol F: DER 352 from Dow Chemicals, or Epikote 235 from Hexion.
  Solid type-1 epoxy resin dispersion in water e.g. Beckopox EP 2375 or Beckopox EP 2384 from Allnex, NPEW-261W55 from NaNya, BE3570W55 from CCP, EPI-REZ 3523 or EPI-REZ 6520 or EPI-REZ 7520 from Hexion.

The epoxy-based binder may be either a liquid epoxy-based binder or a solid epoxy-based binder or a combination thereof. It should be understood that "liquid" and "solid" refers to the physical state of the epoxy-based binder at ambient temperature and pressure (25° C. and 1 atm). In one preferred embodiment the epoxy-based binder is a liquid epoxy-based binder. It should be noted that "liquid" and "solid" epoxy-based binder refers to the physical state of the binder before the dispersion or emulsification of the binder in water if the epoxy-based binder is supplied in water.

The liquid epoxy-based binder may have an epoxy equivalent weight (EEW) value of 150 to 300, preferably 160 to 250 or more preferably 175 to 210.

The liquid epoxy-based binder when dispersed in water may have an epoxy equivalent weight (EEW) value in form of delivery of 150 to 800. It is particularly preferred if the EEW is less than 500 such as 150 to 400, especially 250 to 350. The EEW on the liquid binder that is emulsified may be 100 to 300.

The solid epoxy-based binder may have an epoxy equivalent weight (EEW) value of 300 to 1000. It is most preferred however if the EEW of the solid epoxy-based binder is in the range of 350-750, such as 400-700, especially 500-670.

The solid epoxy-based binder when dispersed in water may have an epoxy equivalent weight (EEW) value in form of delivery of 150 to 2000. It is particularly preferred if the EEW is 500 to 1500, especially 800 to 1000. The use of a solid bisphenol A type epoxy-based binder is most preferred.

The epoxy-based binder is preferably present in 5.0 to 60 dry wt. % of the intumescent coating composition, such as 5.0 to 40 dry wt % of the intumescent coating composition. More preferably the epoxy binder is present in an amount of 10 to 30 dry wt. %, especially 12 to 28 dry wt % most especially 16 to 25 dry wt % of the intumescent coating composition. If a blend of epoxy binders is used these percentages refer to the total epoxy binder content, i.e. adding the dry wt % of each one.

All the dry weight percentages given herein for the components in the intumescent coating composition also apply to the eventual content of these components in the intumescent coating layer. So, for example, the intumescent coating layer of the invention also comprises 10 to 30 dry wt. %, especially 12 to 28 dry wt % most especially 16 to 25 dry wt % of the epoxy binder.

In one preferred embodiment the epoxy-based binders include bisphenol A based binders, such as 4,4'-isopropylidenediphenol-epichlorohydrin resins, bisphenol F based binders and/or novolac based binders. Bisphenol A epoxy-based binders will be known to those in the field and have the general structure below.

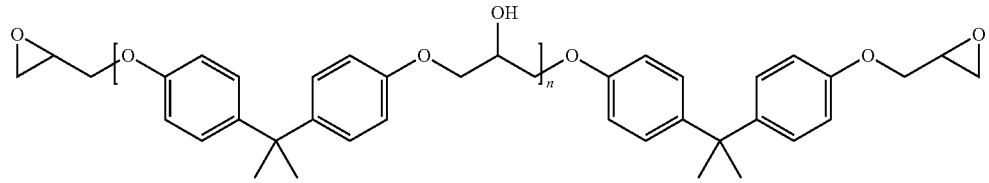

In one preferred embodiment the epoxy-based binder system comprises one or more bisphenol F epoxy-based binders.

The bisphenol F epoxy-based binder may have an EEW value of 100 to 350. However, it is particularly preferred if the EEW is 300 or less such as 100 to 300, especially 150 to 250. Preferably the bisphenol F epoxy-based binder is a liquid.

The Mw of the bisphenol F resin may be more than 170 g/mol. A preferred bisphenol F (4',4'-methylenebisphenol) epoxy-based binder derives from the combination of bisphenol F and epichlorohydrin. The use of a difunctional epoxy-based bisphenol F binders is especially preferred.

A combination of two or more bisphenol F binders might be used.

Curing Agent

The epoxy-based binder system also comprises at least one curing agent. The curing agent can be any curing agent commonly known as a curing agent for epoxy-based binder systems. Ideally it is amine based.

To obtain a crosslinked network the curing agent must contain at least two "reactive" hydrogen atoms. "Reactive" hydrogen atom refers to the hydrogen atom that is transferred from the nucleophile to the oxygen atom of the epoxide during the ring opening reaction. The curing agent typically contains at least two curing reactive functional groups.

Examples of suitable curing agents are thiol curing agents, polythiol curing agents, amine curing agents, polyamine curing agents, amine functional polyamide and/or aminofunctional polymer curing agents. The curing agent may also alternatively comprise at least one aminofunctional polysiloxane.

Examples of suitable polythiol curing agents are pentaerythriol tetramercapto propionate. Example of a suitable commercially available polythiol curing agent is GABEPRO® GPM800 from Gabriel performance materials.

In one preferred embodiment the epoxy-based binder system comprises at least one amine functional curing agent. The curing agent typically contains at least two amine groups. The amine groups may be primary or secondary.

Suitable curing agents comprising amines or amino functional polymers are selected from aliphatic amines and polyamines (e.g. cyclo-aliphatic amines and polyamines), amine functional polyamides, polyether amines, polyimidazoles, polyoxy alkylene amines (e.g. polyoxy alkylene diamines), alkylene amines (e.g. alkylene diamines), aralkyl amines, aromatic amines, Mannich bases (e.g. those sold commercially as "phenalkamines"), amino functional silicones or silanes, and including epoxy adducts and derivatives thereof.

In one preferred embodiment the amine functional curing agent comprises a cyclic structure which includes alicyclic amines and modified products of alicyclic amines, preferably polyamines. The term cyclic includes alicyclic, aromatic and heterocyclic polyamines.

In one embodiment adducts of the amine curing agent might also be used. Such adducts can be prepared by reaction of the amine with suitably reactive compounds such as epoxy-binders, epoxy-functional reactive diluent, acrylates, maleates, fumarates, methacrylates or electrophilic vinyl compounds such as acrylonitrile.

Examples of suitable commercially available amine functional curing agents are:

Beckocure EH 2100, Beckopox 2385, Beckopox EP 2384 or Beckocure EH 2260 from Allnex, Aradur 3985 BD or Aradur 943 CH from Huntsman Advanced Materials, and EPIKURE 6870 or EPIKURE 8545 from Hexi on.

In one particularly preferred embodiment, the curing agent is an aliphatic and/or cycloaliphatic polyamine.

It will be appreciated that the curing agent can be supplied neat or in water. Surfactants and other chemicals suitable for improving water compatibility may also be present. Ideally the curing agent does not comprise a solvent other than water. The amine functional curing agent is preferably emulsified in water. The solid content of the amine curing agent is preferably 40 to 80 wt %. The amine curing agent preferably comprises 20-60 wt. % water.

One or more curing agents might be used in combination. In one preferred option two or more curing agents are used in combination.

The curing agent should cure the epoxy-based binder at temperatures ranging from 0 to 50° C. It is preferred if the epoxy-based binder system cures at ambient temperatures.

It is common to quote the equivalent weight of the curing agent in terms of the "active hydrogen equivalent weight". The number of "active hydrogen equivalents" in relation to the one or more curing agents is the sum of the contribution from each of the one or more curing agents. The contribution from each of the one or more curing agents to the active hydrogen equivalents is defined as grams of the curing agent divided by the active hydrogen equivalent weight of the curing agent, where the active hydrogen equivalent weight of the curing agent is determined as: grams of the curing agent equivalent to 1 mol of active hydrogen. For adducts with epoxy resins the contribution of the reactants before adduction is used for the determination of the number of "active hydrogen equivalents" in the complete epoxy-based binder system.

It is also common to quote the number of "epoxy equivalents" in the epoxy-based binders. The "epoxy equivalents" is the sum of the contribution from each of the one or more epoxy-based binders and any other component that contains an epoxy such as a silane or a reactive diluent. The contribution from each of the one or more epoxy-based binders to the epoxy equivalents is defined as grams of the epoxy-based binder divided by the epoxy equivalent weight of the epoxy-based binder, where the epoxy equivalent weight of the epoxy-based binder is determined as: grams of the epoxy resin equivalent to 1 mol of epoxy groups. For adducts with epoxy-based binder the contribution of the reactants before adduction is used for the determination of the number of "epoxy equivalents" in the epoxy-based binder system.

Preferably the ratio between the hydrogen equivalents of the totality of the curing agents and the totality of epoxy equivalents in the epoxy-based binder system of the present invention is in the range of 50:100 to 120:100.

Especially preferred epoxy-based binder systems have a ratio between the hydrogen equivalents of the curing agent and the epoxy equivalents of the epoxy resin in the range of 60:100 to 120:100 such as 80:100 to 120:100, e.g. 90:100 to 110:100.

It will be appreciated that the curing agent is shipped separately to the epoxy-based binder and is only mixed with the epoxy-based binder shortly before application. The mixing ratio of the compositions comprising the epoxy-based binder and the curing agent is, of course, governed by the relative amounts of epoxy and active hydrogens present. Ideally, the mixing ratio in solids volume is 1:1 to 10:1. The curing agent composition and the epoxy-based binder composition are mixed shortly before application to the substrate.

In one embodiment, the curing agent may be present in the intumescent coating composition in the range of 1 to 25 dry wt %, such as 5 to 20 dry wt %.

Whilst a curing accelerator may be used, in one preferred embodiment, the curing agent is employed without the use of a separate accelerator to accelerate the crosslinking process. Some known curing agents are however combined with an accelerator such as a tertiary amine catalyst and that is also within the scope of the invention.

Reactive Diluents

The epoxy-based binder system may further comprise a reactive diluent. The reactive diluent preferably comprises epoxy and/or (meth) acrylic functional groups. The reactive diluent forms part of the binder system and reacts with other components of the binder system during the curing process.

In one preferred embodiment the reactive diluent is an epoxy-functional reactive diluent. The epoxy-functional reactive diluent may be either monofunctional or difunctional.

Examples of such reactive diluents include phenyl glycidyl ether, alkyl glycidyl ether (number of carbon atoms in alkyl group: 1 to 16), glycidyl ester of neodecanoic acid ($R^1 R^2 R^3 C$—COO-Gly, where $R^1 R^2 R^3$ are alkyl groups such as C8 to C10 alkyl and Gly is a glycidyl group), olefin epoxide ($CH_3$—$(CH_2)_n$-Gly, wherein n=11 to 13, Gly: glycidyl group), 1,4-butanediol diglycidyl ether (Gly-O—$(CH_2)_4$—O-Gly), 1,6-hexanediol diglycidyl ether (Gly-O—$(CH_2)_6$—O-Gly), neopentyl glycol diglycidyl ether (Gly-O—$CH_2$—$C(CH_3)_2$—$CH_2$—O-Gly), trimethylolpropane triglycidyl ether ($CH_3$—$CH_2$—$C(CH_2$—O-Gly$)_3$), and C1-20-alkylphenyl glycidyl ether (preferably C1-5 alkylphenylglycidyl ether), e.g. methylphenyl glycidyl ether, ethylphenyl glycidyl ether, propylphenyl glycidyl ether and para tertiary butyl phenyl glycidyl ether (p-TBPGE), reaction products of epichlorohydrin and an oil obtained from the shells of cashew nuts.

In one preferred embodiment the epoxy-functional reactive diluent is reaction products of epichlorohydrin and an oil obtained from the shells of cashew nuts, like for example Cardolite NC-513 from Cardolite.

In another particularly preferred embodiment, the epoxy-functional reactive diluents are aliphatic epoxy-functional reactive diluents. The aliphatic epoxy-functional reactive diluents are preferably formed from the reaction of a compound comprising at least one aliphatic epoxide functionality with an aliphatic alcohol or polyol such as 1,6-hexanediol diglycidyl ether or 1,4-butanediol diglycidyl ether. Aliphatic glycidyl ethers of chain length 8 to 14 are also preferred. Aliphatic epoxy-functional reactive diluents may contribute to the flexibility of the coating film.

The epoxy equivalent weight (EEW) of the epoxy-functional reactive diluent is preferably 50 to 500, more preferred 100 to 400, most preferred 100 to 300.

The epoxy-functional reactive diluent is different from the epoxy binder. It is preferred if the reactive diluent is of low molecular weight such as less than 500 g/mol. Preferably the viscosity of the epoxy-functional reactive diluent is <100 cp, preferably <50 cP, preferably <35 cp. It is therefore a liquid at 23° C. and atmospheric pressure. In another preferred embodiment the reactive diluent comprises (meth) acrylic functional groups.

The (meth)acrylic functional reactive diluent is preferably an aliphatic (meth)acrylate comprising at least two (meth) acrylate functional groups linked by an organic linker. Such a multiester may be a diester, a triester or a tetraester.

The molecular weight of the (meth)acrylate functional reactive diluent is preferably less than 1000, such as less than 750, especially less than 500 g/mol. Ideally, the (meth) acrylic functional reactive diluent will be the (meth)acrylate ester of a polyol such as a diol, or triol or a sugar based polyol such as a sugar alcohol. It is not essential for all OH groups within a polyol to carry the (meth)acrylate ester group, however there should preferably be at least two ester functionalities in the (meth)acrylic ester. Suitable polyols for functionalization include alkylene diols (e.g. hexanediol, pentanediol), saccharides (e.g. mono or disaccharides) or polyols (especially sugar alcohols) such as erythritol, sorbitol, maltitol and mannitol.

(Meth)acrylic functional reactive diluents of particular interest are of formula

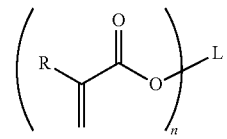

wherein R is H or Me;

n is 2-5; and

L represents the residue of a polyol such as the residue of hexandiol or the residue of a saccharide or sugar alcohol. Thus, at least two OH groups of the polyol carry the acrylate ester shown in the formula above.

L preferably contains only C, H and O atoms. The molecular weight of L is preferably low, such as 1000 g/mol or less.

It is common to quote the number of "acrylate equivalents" in the (meth)acrylic functional reactive diluent. The "acrylate equivalents" is the sum of the contribution from each of the one or more (meth)acrylic functional reactive diluents. The contribution from each of the one or more (meth)acrylic functional reactive diluents to the acrylate equivalents is defined as grams of the (meth)acrylic functional reactive diluent divided by the acrylate equivalent weight of the (meth)acrylic functional reactive diluent, where the acrylate equivalent weight of the (meth)acrylic functional reactive diluent is determined as: grams of the (meth)acrylic functional reactive diluent equivalent to 1 mol of acrylate group. For adducts with curing agents the contribution of the reactants before adduction is used for the determination of the number of "acrylate equivalents" in the complete (meth)acrylic functional reactive diluent system. It is common to include "acrylate equivalents" into the total "epoxy equivalents" when formulating.

A particularly preferred (meth) acrylic reactive diluent is trimethylol propane triacrylate.

The viscosity of the (meth) acrylic functional reactive diluent is preferably less than 300 mPas, more preferably less than 200 mPas, most preferred less than 150 mPas.

A preferred (meth)acrylic functional reactive diluent have an acrylate equivalent weight (AEW) value of 50-200, more preferred 70-150, most preferred 80-125.

Mixtures of (meth)acrylic functional reactive diluents may also be used.

The above reactive diluents can be used singly or in combination of two or more diluents.

The reactive diluent is preferably present in an amount of 0.25 to 15 dry wt %, preferably 0.5 to 10 dry wt. %, more preferred 0.5 to 7.0 dry wt % of the intumescent coating composition, especially 1.0 to 6.0 dry wt %, more especially 1.0 to 5.0 dry wt %. If a blend of reactive diluents is used these percentages refer to the total content of reactive diluents, i.e. adding the wt % of each one.

It will be appreciated that as the reactive diluent might react with the curing agent, that it should be kept separate from the curing agent in the kit used to form the intumescent coating composition.

Silane

The coating composition of the invention may comprise at least one silane. The silane is part of the binder system and reacts with other components of the binder system during curing. Preferably the silane is a functional silane comprising functional groups that can react with the binder system such as amine, epoxy, acryl, methacryl, thiol and isocyanate groups. Silanes of use in the invention are generally of low Mw such as less than 400 g/mol. Suitable silanes are of general formula (I) or (II)

$$Y-R_{(4-z)}SiX_z \quad (I)$$

wherein z is an integer from 1 to 3, $$Y-R_{(3-y)}R^1SiX_y \quad (II)$$

wherein y is an integer from 1 to 2,
each R is a hydrocarbyl group having 1 to 12 C atoms optionally containing an ether or amino linker,
$R^1$ is a hydrocarbyl group having 1 to 12 C atoms;
each X independently represents a halogen group or an alkoxy group.
Y is a functional group bound to R that can react with the epoxy-based binder and/or the curing agent.

Preferably Y is a isocyanate, epoxy, amino, hydroxy, carboxy, thiol, acrylate, or methacrylate group, more preferred epoxy, amino, acrylate or methacrylate groups, most preferred epoxy or amino group. It is particularly preferred if Y is an epoxy group. The Y group can bind to any part of the chain R. It will be appreciated that where Y represents an epoxy group then R will possess at least two carbon atoms to allow formation of the epoxide ring system.

In one particularly preferred embodiment Y is an amino group or epoxy group. The amino groups are preferably $NH_2$. Preferably Y is an epoxy group.

If the Y group is an amino group that can react with the epoxy-based binder, it is preferred if the silane is provided separately from the epoxy-based binder together with the curing agent. In general, in the kit of the invention, the silane should not react with any ingredient of the component of the kit in which the silane is present.

Each X independently represents a halogen group or an alkoxy group. It is especially preferred if X is an alkoxy group such as a C1-6 alkoxy group, especially methoxy or ethoxy group. It is also especially preferred if there are two or three alkoxy groups present. Thus z is ideally 2 or 3, especially 3.

Subscript y is preferably 2.
$R^1$ is preferably C1-4 alkyl such as methyl.
R is a hydrocarbyl group having up to 12 carbon atoms. By hydrocarbyl is meant a group comprising C and H atoms only. It may comprise an alkylene chain or a combination of an alkylene chain and rings such as phenyl or cyclohexyl rings. The term "optionally containing an ether or amino linker" implies that the carbon chain can be interrupted by a —O— or —NH— group in the chain, e.g. to form a silane such as [3-(2,3-Epoxypropoxy)propyl] trimethoxysilane:

$$H_2COCHCH_2OCH_2CH_2CH_2Si(OCH_3)_3.$$

R is preferably an unsubstituted (other than Y obviously), unbranched alkyl chain having 2 to 8 C atoms.

A preferred silane general formula is therefore of structure (III)

$$Y'-R'_{(4-z')}R^1SiX'_{z'} \quad (III)$$

wherein z' is an integer from 2 to 3,
R' is a unsubstituted, unbranched alkyl chain having 2 to 8 C atoms optionally containing an ether or amino linker,
Y' is an amino or epoxy functional group bound to the R' group, and
X' represents an alkoxy group.

Examples of such silanes are the many representatives of the products manufactured by Degussa in Rheinfelden and marketed under the brand name of Dynasylan(R)D, the Silquest(R) silanes manufactured by Momentive, and the GENOSIL(R) silanes manufactured by Wacker.

Specific examples include methacryloxypropyltrimethoxysilane (Dynasylan MEMO, Silquest A-174NT), 3-mercaptopropyltri(m)ethoxysilane (Dynasylan MTMO or 3201; Silquest A-189), 3-glycidoxypropyltrimethoxysilane (Dynasylan GLYMO, Silquest A-187), tris(3-trimethoxysilylpropyl) isocyanurate (Silquest Y-11597), gamma-mercaptopropyltrimethoxysilane (Silquest A-189), beta-(3,4-epoxycyclohexyl)ethyltrimethoxysilane (Silquest A-186), gamma-isocyanatopropyltrimethoxysilane (Silquest A-Link 35, Genosil GF40), (methacryloxymethyl)trimethoxysilane (Genosil XL 33), isocyanatomethyl)trimethoxysilane (Genosil XL 43), aminopropyltrimethoxysilane (Dynasylan AMMO; Silquest A-1 110), aminopropyltriethoxysilane (Dynasylan AMEO) or N-(2-aminoethyl)-3-aminopropyltrimethoxysilane (Dynasylan DAMO, Silquest A-1 120) or N-(2-aminoethyl)-3-aminopropyltriethoxysilane, triaminofunctional trimethoxysilane (Silquest A-1130), bis(gamma-trimethoxysilylpropyl)amine (Silquest A-1 170), N-ethyl-gamma-aminoisobytyltrimethoxy silane (Silquest A-Link 15), N-phenyl-gamma-aminopropyltrimethoxysilane (Silquest Y-9669), 4-amino-3,3-dimethylbutyltrimethoxysilane (Silquest Y-1 1637), (N-cyclohexylaminomethyl)triethoxysilane (Genosil XL 926), (N-phenylaminomethyl)trimethoxysilane (Genosil XL 973), Deolink Epoxy TE and Deolink Amino TE (D.O.G Deutsche Oelfabrik) and mixtures thereof.

Other specific silanes of interest include 3-Aminopropyltriethoxysilane, 3-Aminopropyltrimethoxysilane, N-(Aminoethyl)-aminopropyltrimethoxysilane $H_2NCH_2CH_2NHCH_2CH_2CH_2Si(OCH_3)_3$, 3-aminopropyl-methyldiethoxysilane, 3-(2-aminoethylamino)propylmethyldimethoxysilane, $(H_2NCH_2CH_2NHCH_2CH_2CH_2SiCH_3(OCH_3)_2)$, [3-(2,3-Epoxypropoxy)propyl]triethoxysilane $(H_2COCHCH_2OCH_2\ CH_2CH_2Si(OCH_2CH_3)_3$, [3-(2,3-Epoxypropoxy)propyl]trimethoxysilane $(H_2COCHCH_2OCH_2CH_2CH_2\ Si(OCH_3)_3)$. Silanes delivered in water from Dynasylan: Aqueous 3-aminopropylsilane hydrolysate Hydrosil 1151 or Hydrosil 1153, reactive organofunctional siloxane oligomer in water Hydrosil 2775 or Hydrosil 2776.

The use of silane 3-glycidoxypropyltrimethoxysilane is especially preferred. A mixture of silanes might also be used.

The amount of silane present in the intumescent coating composition may be present in an amount of 0.1 to 15 wt %, preferably 0.25 to 15 wt. % such as 0.5 to 10 wt. %, more preferred 0.5 to 7.0 wt. % of the dry weight of the coating composition, especially 1.0 to 6.0 wt %, more especially 1.0 to 5.0 wt %. In some embodiments, the silane is present in an amount of 1.5 to 4.5 wt % of the dry weight of the intumescent coating composition. If a blend of silanes is used these percentages refer to the total silane content, i.e. adding the wt % of each one.

It will be appreciated that if the silane comprises functional groups that can react with the epoxy binder it should be kept separate from the epoxy binder in the kit used to form the intumescent coating composition.

Accelerators

The epoxy-based binder system may comprise a curing accelerator. The curing accelerator may be any known curing accelerator for epoxy-based coating systems such as tertiary amines, (meth)acrylic esters, imidazoles, organic acids, phenols and organic phosphines.

Examples of suitable tertiary amines are triethanol amine, dialkylamino ethanol, triethylene diamine, 1,4-diazabicyclo[2.2.2]octane, 1,8-diaza-bicyclo[5.4.0]undec-7-ene and 2,4,6-tris(dimethylaminomethyl)phenol. One particularly preferred accelerator is 2,4,6-tris(dimethylaminomethyl)phenol such as Ancamine K54 from Evonik.

Examples of suitable imidazoles are 2-methylimidazole, 2-phenylimidazole, 2-phenyl-4-methyl imidazole and 2-heptadecylimidazole.

Examples of suitable organic acids are benzoic acid derivatives such as salicylic acid.

Examples of suitable organic phosphines are tributyl phosphine, methyldiphenyl phosphine, triphenyl phosphine, diphenyl phosphine and phenyl phospine.

Examples of suitable phenols are alkyl phenols such as nonylphenol.

Examples of suitable (meth) acrylic esters are the same as described for the (meth) acrylate-functional reactive diluents above.

Flame Retardant

The binder system may also comprise at least one flame retardant such as a phosphorus containing flame retardant. Suitable flame retardants include phosphoric acid, phosphite, phosphonate and phosphoric acid esters. Halogen-based flame retardants such as tris(2-chloroisopropyl)phosphate may also be used.

The use of triarylphosphate esters, especially triphenyl phosphate esters are preferred. Where a flame retardant is used this must be different and hence separate from any other component of the intumescent coating.

Preferably the flame retardant forms from 2.0 to 10 dry wt % of the intumescent coating composition, preferably 2.5 to 10% by dry weight, e.g. 2.5 to 8.0 dry wt %, especially 3.0 to 8.0 dry wt %.

Additives that do not Form Part of the Binder System

The intumescent coating composition may also contain various other components. In particular, the intumescent coating composition may comprise additives selected from pigments, fillers, nucleating agents, coalescing agents, dispersing agents, defoamers and rheology modifiers.

Fillers may be optionally added to the coating composition to, inter alia, aid char formation and to strengthen the char and prevent char degradation (e.g. acting as char reinforcing agents). Such fillers include solids such as zinc borate, zinc stannate, zinc hydroxystannate, glass flake, glass spheres, polymeric spheres, fibers (ceramic, mineral, glass/silica based), aluminium hydroxide, antimony oxide, boron phosphate, and fumed silica. The fillers preferably constitute from 1% to 25% by dry weight of the intumescent coating composition.

Inorganic "nucleating" agents may also be included in the intumescent coating compositions of the present invention as they provide sites for the intumescent char to form and improve the thermal resistance properties and stability of the intumescent char during a fire.

Thus, the intumescent coating compositions of the present invention may contain a nucleating agent, examples of which include titanium dioxide, zinc oxide, aluminium oxide, silica, silicates, heavy metal oxides such as cerium oxide, lanthanum oxide and zirconium oxide, calcium carbonate, carbon black, talcum, wollastonite, micaceous iron oxide, china clay, mica and bentonite clay.

Examples of the color pigments include titanium white, red iron oxide, yellow iron oxide, black iron oxide, carbon black and organic color pigments.

As the rheology modifier, a thixotropic agent suitable for water-based formulations, such as cellulosic thickeners, xanthan gum, guar gum, organically modified clays such as bentonite, hectorite and attapulgite clays, organic wax thixotropes based on castor oil and castor oil derivatives, polyamide waxes and fumed silica may be employed.

Low viscous water miscible hydrocarbon resins may be optionally included as hydrophobic modifiers, such as to improve flexibility, corrosion protection, and drying time. Examples of suitable commercially available water miscible hydrocarbon resins include NOVARES W, NOVARES WA 2, NOVARES WA 7, and NOVARES CA 80.

Coalescing agents may optionally be included. In a waterborne paint composition, the applied wet product is inhomogeneous, as opposed to a solventborne composition which will be homogenous when applied. There is higher risk of epoxy-rich and epoxy-poor (curing agent rich) regions in the cured film when the applied composition is inhomogeneous. This will cause incomplete curing, an uneven appearance, roughened surface and weakened film properties. To achieve a fully cured system, epoxy particles must coalesce with curing agent particles. Coalescing agents aid this process in the water phase. Examples of suitable coalescing agents are ester alcohol, benzyl alcohol, propylene glycol monomethyl ether (PM), propylene glycol propyl ether (PnP), dipropylene glycol n-butyl ether (DPnB), propylene glycol phenyl ether (PPh), tripropylene glycol n-butyl ether (TPnB), ethylene glycol propyl ether (EP), ethylene glycol butyl ether (EB), diacetone alcohol (DAA) and dipropylene glycol methyl ether (DPM).

In order to improve or facilitate dispersion of the intumescent ingredients in the waterborne intumescent coating composition it may be desirable to incorporate wetting/dispersion additives that are compatible with an aqueous intumescent coating.

Suitable polar dispersants are highly polar oligomers or polymers such as those containing multiple hydroxyl, carboxyl, amino or amide groups or mixtures of such groups. The term polar is used herein to define therefore a dispersant comprising plurality, e.g. at least 10, polar functional groups selected from hydroxyl, carboxyl, amino or amide groups. Suitable materials include polyalkylene glycol, polyacrylamide, polyethercarboxylate, and polycarboxylates.

Typically there might be 0.1 to 2.0 dry wt % of dispersant present in the intumescent coating composition.

Viewed from another aspect therefore the invention provides an intumescent coating system comprising:
 B) an intumescent coating layer;
 C) a top coat layer;
 wherein the intumescent coating layer comprises
 i. an epoxy-based binder;
 ii. a curing agent;
 iii. polar dispersant;
 iv. an expansion agent; and
 v. an acid generating compound;

wherein the top coat layer comprises an acrylic-based binder, a polyurethane binder or a silicone-based binder.

It may also be possible to include anticorrosive components in the coating composition. Such components may be metal oxides, metal carbonates, talc, feldspar and so on to act as anti-corrosive materials. Specific anticorrosive functional pigments include zinc phosphate, zinc oxide, zinc dust, aluminium flakes, and lead oxide. Auxiliary corrosion inhibitors, for example a molybdate, phosphate, tungstate or vanadate, ultrafine titanium dioxide, and/or zinc oxide and/or a filler such as silica, calcined clay, alumina silicate, talc, barytes or mica.

The total amount of the above-mentioned various additive components depend upon the use and cannot be determined indiscriminately, but they are frequently contained in the total amount of 5.0 to 65% by dry weight in the intumescent coating composition, such as 5.0 to 50 dry wt %, preferably 5.0 to 30 dry wt %.

Preparation of the Intumescent Coating Composition

The intumescent coating composition may be prepared by any suitable technique that is commonly used within the field of paint production. Thus, the various constituents may be mixed together using a high speed disperser, a ball mill, a pearl mill, a three-roll mill, an inline mixer etc.

Conveniently the intumescent coating composition is supplied as a kit of parts. Part (A) comprises the epoxy resin and part (B) the curing agent. Non-reactive components such as the fillers and pigments and the intumescent components can be supplied in either part (A) or (B). The reactive diluent, if present, is conveniently added to part (A) as it reacts with the curing agent. The skilled person will be able to design an appropriate kit to supply the components for transport.

It will be appreciated that the relative amounts of each component within any part of the kit will be determined by the final wt % values in the intumescent coating composition and the relative mixing ratios.

The intumescent coating compositions to be used herein are conveniently prepared by mixing the components. As an example, the first composition (A) and the curing agent component (B) (the second composition) can be mixed by adding the curing agent to the epoxy first composition and stirring well until the mixture is homogeneous. The mixture is immediately ready for application, e.g. by spray application or manually, but may also be given an induction time prior to application. Alternative spray equipment designed specifically for the application of two component, highly viscous paints will not require pre-mixing of the two components. The two components would then be mixed mechanically just prior to the paint reaching the application gun allowing convenient application of the composition. Conversely, the curing agent component (B) (the second composition) can be introduced by plural component spray gun configuration and mix with the epoxy first composition (A) immediately before contact with the substrate.

Application of the Intumescent Coating Composition

The intumescent coating composition can be applied to a substrate (in particular a steel structure) by spraying, e.g. spray using well-known airless spray techniques, or manually, using, for example, a brush.

When applying the intumescent coating composition, it is possible to incorporate a mesh or scrim which is embedded within the intumescent coating. The mesh, or scrim is typically comprised of one, or a combination, of; glass, carbon, basalt, or some other high temperature resistant fibre based material. These can also comprise or be combined with a fine metal wire, for example carbon or stainless steel. This mesh is commonly used in the system to provide an element of reinforcement or control of the intumescent foam as it forms during the intumescent reaction. It is preferred if the intumescent coating composition of the present invention does not contain a mesh or scrim.

Film Thickness

The intumescent coating composition is applied in high dry film thickness to ensure a good fire protection. The applied film thickness might vary depending on the nature of substrate being coated and its predicted fire exposure scenario. The dry film thickness of the intumescent coating layer is preferably 0.1 to 8.0 mm, e.g. 0.1 to 4.0 mm, especially 0.2 to 2.0 mm. The intumescent coating composition may be applied several times to achieve the appropriate dry film thickness.

Curing

Once a substrate is coated with the intumescent coating composition, the intumescent coating composition must be cured. The intumescent coating composition may cure spontaneously. Whilst heat may be used to encourage curing, the compositions of the invention cure at ambient temperature without further intervention.

In a further aspect the invention includes a process in which coats of the intumescent coating composition are applied to an undercoat of a primer composition.

In a particularly preferred embodiment, the intumescent coating layer is prepared from an intumescent coating composition comprising:
  (i) 10 to 30 dry wt % of at least one epoxy binder;
  (ii) at least one curing agent;
  (iii) 12 to 40 dry wt % an acid-generating compound;
  (iv) 1.0 to 15 dry wt % an expansion agent;
  (v) 1.0 to 15 dry wt % a carbon donor compound;
  (vi) 10 to 30 wt % of water.

Primer Layer

It is preferred if the substrate has a primer layer therein onto which the intumescent coating composition is applied. The primer layer is conventional and is typically formed from an epoxy resin but other options may be used. The primer layer preferably comprises at least 20 wt % epoxy resin, preferably at least 25 wt % epoxy resin.

Examples of suitable primer layers are coatings based on epoxy, modified epoxy (such as modified with polyvinyl butyral), polyurethane, acrylic, vinyl and chlorinated rubber. Preferably the primer layer is an epoxy-based primer or a zinc-rich epoxy-based primer.

In another embodiment, the primer layer is a polysiloxane sol primer such as described in US2014/0106176. The polysilane sol may be a component formed by the condensation reaction of at least one silane to form a highly branched polysilane sol which contains a plurality of free silanol functionalities. The polysilane sol may be derived from at least one alkoxysilane precursor that has been subjected to hydrolysis to form the corresponding silanol. It will be appreciated that in many alkoxysilanes there are multiple alkoxy groups (typically up to three such groups) and hence there are multiple hydrolysis products possible depending on the hydrolysis procedure. Fully hydrolysed and partially hydrolysed products can be formed. This hydrolysis reaction results in the formation of alcohol.

The hydrolysed silanes/partially hydrolysed silanes can then be condensed together as is well known to form complex oligomers/polymers. Due to the various different monomers present when a hydrolysis reaction is effected, a complex polysilane sol forms which cannot be easily characterised by a general formula.

The dry film thickness of the primer is ideally in the range of 15 to 500 microns.

Top Coat layer

A top coat layer is applied over the intumescent coating layer which results from the curing of the intumescent coating composition. The top coat layer is obtained by the application of a top coat composition onto the intumescent coating layer which is optionally cured or partially cured before application of the top coat composition.

The top coat composition is preferably waterborne.

The top coat is preferably non-intumescent, e.g. in should be free of an acid generating compound and/or expansion agent, for example. The top coat should be decorative rather than intumescent.

The present of intumescent components such as the acid generating component or expansion agent in the top coat may limit the options available to the skilled person in terms of the nature of the top coat. By having the fire performance components concentrated in one layer, the fire performance is not also dependent on the topcoat and the skilled person has more flexibility in the choice of topcoat materials.

Preferably the top coat composition is free of any low boiling organic solvents and thereby has a low content of volatile organic compounds (VOC). The VOC content of the top coat composition is preferably less than 150 g/L, more preferably less than 100 g/L. In this regard, volatile organic compounds include benzyl alcohol.

The top coat composition must however be waterborne. Preferably, the top coat composition has a volume solids content of at least 35%, such as at least 50%, e.g. 50 to 60% volume solids.

The top coat composition may comprise at least 10 wt % water such as at least 20 wt % water, such as at least 30 wt % water, e.g. 30 to 50 wt % water. In one preferred embodiment the top coat compositions comprises more than 30 wt % water.

The top coat composition comprises an acrylic-based binder, polyurethane-based binder or a silicone-based binder. The use of an acrylic based binder and a polyurethane-based binder is preferred. In one particularly preferred option the top coat composition comprises an acrylic-based binder.

Polysiloxane-Based Binder

The polysiloxane-based binder present in the top coat layer of the present invention can generally be any curable polysiloxane. As used herein when referring to the polysiloxane, the term "curable" means that the polysiloxane comprises functional groups that enable a crosslinking reaction to take place either directly between polysiloxane molecules or via a crosslinking agent. Preferably the polysiloxane-based binder is moisture curable.

The polysiloxane-based binder is preferably an organopolysiloxane with terminal and/or pendant curing-reactive functional groups. A minimum of two curing-reactive functional groups per molecule is preferred. Preferably the coating composition comprises a polysiloxane having a functionality of more than two, preferably more than 3. Examples of curing-reactive functional groups are silanol, alkoxy, acetoxy, enoxy, ketoxime, alcohol, amine, epoxy and/or isocyanate. Ideally there are no vinyl groups present.

In a particularly preferred embodiment therefore, the polysiloxane based binder is not cured via vinyl functional groups. The polysiloxane is ideally condensation cured.

Preferred curing-reactive functional groups are selected from silanol, alkoxy or acetoxy groups. Alkoxy-functional polysiloxanes, especially methoxy-functional polysiloxanes are particularly preferred. As used herein, the term "alkoxy-functional polysiloxane" includes but is not limited to alkoxy-silyl-functional polysiloxanes. In another preferred embodiment the curing reactive functional group is silanol. Optionally the polysiloxane-based binder comprises more than one type of curing-reactive functional group. Preferably at least one polysiloxane-based binder comprises a single type of curing-reactive functional group.

The curing reaction is typically a condensation cure reaction. The polysiloxane-based binder optionally comprises more than one type of curing-reactive group and may be cured, for example, via both condensation cure and amine/epoxy curing.

The polysiloxane-based binder present in the coating compositions of the present invention typically comprises at least 30 wt % polysiloxane parts, preferably more than 50 wt % polysiloxane parts and still more preferably more than 70 wt % polysiloxane parts such as 99.99 wt % polysiloxane parts or more.

The polysiloxane parts are defined as repeat units comprising the motif —Si—O— based on the total weight of the at least one polysiloxane. The wt % of polysiloxane parts can be determined based on the stoichiometric wt ratio of starting materials in the polysiloxane synthesis. Alternatively, the polysiloxane content can be determined using analytical techniques such as IR or NMR. Information about the wt. % polysiloxane parts in a commercially available polysiloxane is easily obtainable from the supplier.

It is to be understood that the polysiloxane-based binder can comprise a polysiloxane consisting of a single repeating sequence of siloxane units or be interrupted by non-siloxane parts, e.g. organic parts.

The organic parts may comprise, for example, alkylene, arylene, poly(alkylene oxide), amide, thioether or combinations thereof, preferably the organic parts may comprise, for example, alkylene, arylene, poly(alkylene oxide), amide, or combinations thereof.

The coating composition may comprise only one type of polysiloxane-based binder or may comprise a mixture of different polysiloxane-based binders.

In a preferred embodiment, the coating composition comprises a branched polysiloxane-based binder, more preferably a branched alkoxy-functional polysiloxane based binder or a branched silanol functional polysiloxane-based binder. A branched methoxy-functional polysiloxane based binder is most preferred. By branched is meant that the polysiloxane chain is branched. In one preferred embodiment the branched polysiloxane-based binder comprises cage-like polysiloxane structures.

In a most preferred embodiment, the coating composition comprises a branched polysiloxane-based binder comprising methyl and phenyl groups.

A preferred polysiloxane-based binder present in the coating compositions of the present invention is represented by formula (D1) below:

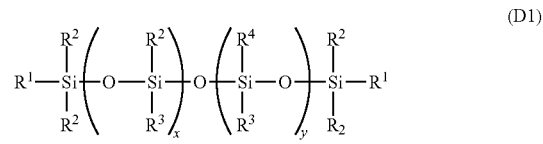

(D1)

wherein
each $R^1$ is independently selected from a hydroxyl group, $C_{1-6}$-alkoxy group, $C_{1-6}$-hydroxyl group, $C_{1-6}$-epoxy containing group, $C_{1-6}$ amine group, $C_{1-10}$ alkyl, $C_{6-10}$ aryl, $C_{7-10}$ alkylaryl or $O-Si(R^5)_{3-z}(R^6)_z$ each $R^2$ is independently selected from $C_{1-10}$ alkyl, $C_{6-10}$ aryl, $C_{7-10}$ alkylaryl or $C_{1-6}$ alkyl substituted by poly (alkylene oxide) and/or a group as described for $R^1$;

each $R^3$ and $R^4$ is independently selected from $C_{1-10}$ alkyl, $C_{6-10}$ aryl, $C_{7-10}$ alkylaryl or $C_{1-6}$ alkyl substituted by poly(alkylene oxide);

each $R^5$ is independently a hydrolysable group such as $C_{1-6}$ alkoxy group, an acetoxy group, an enoxy group or ketoxy group;

each $R^6$ is independently selected from an unsubstituted or substituted $C_{1-6}$ alkyl group;

z is 0 or an integer from 1-2;

x is an integer of at least 2;

y is 0 or an integer of at least 1.

Preferably $R^1$ is selected from a hydroxyl group and $O-Si(R^5)_{3-z}(R^6)_z$, wherein $R^5$ is a $C_{1-6}$ alkoxy group, $R^6$ is $C_{1-6}$ alkyl and z is 0 or an integer from 1-2. More preferably $R^1$ is selected from a hydroxyl group and $O-Si(R^5)_{3-z}(R^6)_z$, wherein $R^5$ is a $C_{1-6}$ alkoxy group, $R^6$ is $C_{1-3}$ alkyl and z is 0 or an integer from 1-2. Most preferably R1 is $O-Si(R^5)_{3-z}(R^6)_z$, wherein $R^5$ is a $C_{1-6}$ alkoxy group, $R^6$ is $C_{1-3}$ alkyl and z is 0 or an integer from 1-2.

Preferably $R^2$ is a $C_{1-10}$ alkyl group, $C_{6-10}$ aryl, $C_{7-10}$ alkylaryl or $O-Si(R^5)_{3-z}(R^6)_z$ Preferably $R^3$ is a $C_{1-10}$ alkyl group or $C_{6-10}$ aryl. More preferably $R^3$ is a $C_{1-4}$ alkyl group or a $C_6$ aryl group, still more preferably a $C_{1-2}$ alkyl group or a $C_6$ aryl group, and yet more preferably a methyl group or a phenyl group.

Preferably $R^4$ is a $C_{1-10}$ alkyl group or $C_{6-10}$ aryl. More preferably $R^3$ is a $C_{1-4}$ alkyl group or a $C_6$ aryl group, still more preferably a $C_{1-2}$ alkyl group or a $C_6$ aryl group, and yet more preferably a methyl group or a phenyl group.

The weight average molecular weight (Mw) of the at least one polysiloxane-based binder present in the top coat composition of the present invention is typically in the range of 200 to 50,000 g/mol, preferably 200 to 10,000, more preferably 400 to 5000 g/mol, most preferably 500 to 2000 g/mol.

Preferred top coat compositions of the present invention comprise 10-95 wt % of the polysiloxane-based binder, more preferably 20-80 wt %, still more preferably 25-60 wt %, based on the total dry weight of the composition.

The polysiloxane-based binder may be dispersed or emulsified in water. Appropriate chemical modifications may be performed on the binder to improve water compatibility. The dispersion or emulsion may also comprise surfactants and emulsifiers to provide water compatibility. In addition, further components such as stabilizers, defoamers, dispersing agents and biocides may be present.

The polysiloxane-based binder may optionally be cured in the presence of a crosslinker that suitably reacts with the curing-reactive functional groups in the polysiloxane-based binder to form a crosslinked coating when exposed to moisture. The crosslinking agent may also suitably act as a base catalyst for the hydrolysation/condensation reaction.

The skilled person will appreciate that the appropriate crosslinking agents are chosen depending on the type of curing-reactive functional groups present in the polysiloxane-based binder. If the curing-reactive functional groups are silanol or alkoxy, a preferred crosslinking agent is an organosilicon compound represented by the general formula shown below, a partial hydrolysis-condensation product thereof, or a mixture of the two:

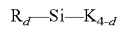

wherein each R is independently selected from an unsubstituted or substituted monovalent hydrocarbon group of 1 to 6 carbon atoms or a $C_{1-6}$ alkyl substituted by poly(alkylene oxide).

each K is independently selected from a hydrolysable group such as an alkoxy group; and d is 0, 1 or 2, more preferably 0 or 1.

Preferred crosslinkers of this type include tetraethoxysilane, vinyltris(methylethyloximo)silane, methyltris(methylethyloximo)silane, vinyltrimethoxysilane, methyltrimethoxysilane and vinyltriisopropenoxysilane as well as hydrolysis-condensation products thereof. Suitable crosslinking agents are commercially available, such as Silcate TES-40 WN from Wacker and Dynasylan A from Evonik.

In order to assist the curing process, the polysiloxane-based top coat composition of the present invention preferably comprises a catalyst. Representative examples of catalysts that can be used include transition metal compounds, metal salts and organometallic complexes of various metals, such as, tin, iron, lead, barium, cobalt, zinc, antimony, cadmium, manganese, chromium, nickel, aluminium, gallium, germanium, titanium, boron, lithium, potassium, bismuth and zirconium. The salts preferably are salts of long-chain carboxylic acids and/or chelates or organometal salts.

Examples of suitable tin-based catalysts include for example dibutyltin dilaurate, dibutyltin dioctoate, dibutyltin diacetate or dioctyltin dilaurate. Examples of commercially available tin catalysts include BNT-CAT 400 and BNT-CAT 500 from BNT Chemicals, FASCAT 4202 from PMC Organometallix and Metatin Katalysator 702 from DOW.

Examples of suitable zinc catalysts are zinc 2-ethylhexanoate, zinc naphthenate and zinc stearate. Examples of commercially available zinc catalysts include K-KAT XK-672 and K-KAT670 from King Industries and Borchi Kat 22 from Borchers.

Examples of suitable bismuth catalysts are organobismuth compounds such as bismuth 2-ethylhexanoate, bismuth octanoate and bismuth neodecanoate. Examples of commercial organobismuth catalysts are Borchi Kat 24 and Borchi Kat 315 from Borchers. K-KAT XK-651 from King Industries, Reaxis C739E50 from Reaxis and TIB KAT716 from T113 Chemicals.

The catalyst may also be an organic compound, such as triethylamine, guanidine, amidine, cyclic amines, tetramethylethylenediamine, 1,4-ethylenepiperazine and pentamethyldiethylenetriamine. Further examples include aminosilanes, such as 3-aminopropyltriethoxysilane and N,N-dibutylaminomethyl-triethoxysilane.

In one preferred embodiment the catalyst is a tin, titanium, bismuth, guanidine and/or amidine catalyst, more preferably a tin, titanium, guanidine and/or amidine catalyst.

Polyurethane-Based Binder

Polyurethane-based binders useful in the present invention preferably comprises: a) a poly-isocyanate component and b) a hydroxy functional component, comprising at least two hydroxyl groups. The cross-linking is from the reaction between the poly-isocyanate component a) and hydroxyl functional component b).

Suitable poly-isocyanates for use as poly-isocyanate component a) in the coating composition are well known in the art. Examples of suitable low molecular weight poly-isocyanates, having a molecular weight of 168 to 300 g/mol, include: hexamethylene diisocyanate (HDI), 2,2,4- and/or 2,4,4-trimethyl-1,6-hexamethylene diisocyanate, dodecamethylene diisocyanate, 2,4-diisocyanato-1-methyl-benzene (toluene diisocyanate, TDI), 2,4-diisocyanato-1-methylbenzene, 1,4-diisocyanatocyclohexane, 1-isocyanato-3,3,5- trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained in a known manner by the phosgenation of aniline/formaldehyde condensates, 2,4- and/or 2,6-diisocyanatotoluene, and any mixture of these compounds.

In some preferred top coat layers of the present invention the polyisocyanate component a) is selected from aliphatic polyisocyanates, e.g. hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, and 2,4- and/or 4,4'-diisocyanato-diphenyl methane.

In other preferred top coat layers of the present invention the polyisocyanate component a) is selected from aromatic polyisocyanates, e.g. 2,4-diisocyanato-1-methyl-benzene (toluene diisocyanate, TDI), 2,4-diisocyanato-1-methyl-benzene and mixtures of these isomers with their higher homologues which are obtained in known manner by the phosgenation of aniline/formaldehyde condensates, 2,4- and/or 2,6-diisocyanatotoluene and any mixtures of these compounds.

In preferred top coat layers of the present invention the polyisocyanate component a) is a derivative of the above-mentioned monomeric poly-isocyanates, as is conventional in the art. These derivatives include polyisocyanates containing biuret groups. Examples of particularly preferred derivatives include N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Examples of suitable commercially available poly-isocyanates are:

Bayhydur® 2858 XP, Bayhydur® XP2451/1, Bayhydur® XP2547, Bayhydur® XP2655, Bayhydur® 7959, Desmodur® N3400, Desmodur® N3900 from Covestro.

Easaqua™ M 502, Easaqua™ L 600, Easaqua™ XD 401, Easaqua™ XD 803, Easaqua™ XD 870, Tolonate™ X FLO 100, Tolonate™ HDT-LV, Tolonate™ HDT-LV2 from VENCOREX.

In one preferred option the polyisocyanate component a) is a pre-polymer or semi pre-polymer The pre-polymers and semi pre-polymers may be prepared from polyhydroxyl compounds such as ethylene glycol, propylene glycol, trimethylol propane, 1,6-dihydroxy hexane; low molecular weight, hydroxyl-containing esters of these polyols with dicarboxylic acids; low molecular weight ethoxylation and/or propoxylation products of these polyols; and mixtures of the afore-mentioned polyvalent modified or unmodified alcohols.

Preferably the pre-polymers and semi pre-polymers are prepared from relatively high molecular weight polyhydroxyl compounds. These polyhydroxyl compounds have at least two hydroxyl groups per molecule.

Polyether polyols are also suitable for the preparation of the isocyanate group-containing pre-polymers and semi pre-polymers.

Hydroxyl group-containing polycarbonates are also suitable for the preparation of the pre-polymers and semi pre-polymers.

Preferably the hydroxy functional component b) is based in whole or in part on organic polyhydroxyl compounds and include both low molecular weight polyhydroxyl compounds and relatively high molecular weight polyhydroxyl compounds.

Particularly preferred hydroxyl functional, isocyanate-reactive, compounds that may be used as component b) are the hydroxy functional poly acrylates known for use in polyurethane coatings. The copolymers are based on olefinic monomers containing hydroxyl groups and olefinic monomers that are free from hydroxyl groups. Examples of suitable monomers include vinyl and vinylidene monomers such as styrene, α-methyl styrene, o- and p-chloro styrene, o-, m- and p-methyl styrene, p-tert-butyl styrene; acrylic acid; (methy)acrylonitrile; acrylic and methacrylic acid esters of alcohols containing 1 to 8 carbon atoms such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having 4 to 8 carbon atoms in the alcohol component; (methy)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2, hydroxypropyl-, 4-hydroxybutyl-acrylate and methacrylate and trimethylol propane-mono- or pentaerythritomono-acrylate or methyacrylate. Mixtures of the afore-mentioned monomers may also be used for the preparation of the hydroxy functional poly acrylates. Mixtures of the polyhydroxyl compounds hereinbefore described may also be used as component b).

In preferred polyurethane based binders, components a) and b) are used in amounts sufficient to provide an equivalent ratio of isocyanate groups to isocyanate-reactive (hydroxyl) groups of 0.5:1 to 5:1, preferably 0.8:1 to 2:1, more preferably 0.8:1 to 1.5:1, even more preferably 0.8:1 to 1.2:1. The hydroxyl functional compound b) is preferably present in an amount such that up to 20 hydroxyl groups are present.

The hydroxy functional compound b) may be dispersed or emulsified in water. The hydroxy-functional compound b) may also comprise surfactants, emulsifiers and appropriate chemical modifications to provide water compatibility. In addition, further components such as stabilizers, defoamers, dispersing agents and biocides may be present.

The hydroxy-functional compound b) dispersion or emulsion preferably has a water content of 45-65 wt. %

Examples of suitable commercially hydroxyl functional (isocyanate-reactive) resins include:

Bayhydrol® A 242, Bayhydrol® A 2058, Bayhydrol® A 2427, Bayhydrol® A 2457, Bayhydrol® A 2470, Bayhydrol® A 2542, Bayhydrol® A 2546, Bayhydrol® A 2601, Bayhydrol® A 2646, Bayhydrol® A 2651, Bayhydrol® A 2695, Bayhydrol® A 2845, Bayhydrol® U XP 2766 from Covestro.

Antkote 2036, Antkote®2025, Antkote®2033, Antkote®2035, Antkote®2042 from WANHUA.

MACRYNAL® SM 6810w/42WA, MACRYNAL® SM 6817w/44WA, MACRYNAL® SM 6825w/41WA, MACRYNAL® SM 6826w/43WA, MACRYNAL® VSM 2521w/42WAB, MACRYNAL® VSM 6299w/42WA, SETAQUA® 37-6517, SETAQUA® 6510, SETAQUA® 6511, SETAQUA® 6514, SETAQUA® 6515, SETAQUA® 6516, SETAQUA® 6522, SETAQUA® 8455 from ALLNEX.

Catalysts are optionally used with polyurethane-based binders and to speed up the curing reaction. Examples of suitable catalysts include tetramethylbutanediamine (TMBDA), N-alkyl morpholines, triethylamine (TEA), 1,8-diazabicyclo[5.4.0]undecene-7 (DBU), pentamethyldiethylene-triamine (PMDETA), zinc octoate, dioctyltin dilaurate dibutyltin dilaurate, and dibutyltin oxide, in particular from dioctyltin dilaurate dibutyltin dilaurate, and dibutyltin oxide.

Acrylic-Based Binder

Any known acrylic based binder can be used to prepare the top coat composition. Typically acrylic-based bindersof interest are those prepared using one or more monomers such as (meth)acrylic acids or esters such as methyl (meth)acrylate, ethyl (meth)acrylate, butyl (meth)acrylate, 2-ethylhexyl (meth)acrylate, 2-hydroxyethyl (meth)acrylate, 2-hydroxypropyl (meth)acrylate, 3-hydroxypropyl (meth)acrylate, 2-hydroxy-1-methylethyl (meth)acrylate, 4-hydroxybutyl (meth)acrylate and hydroxyisobutyl (meth)acrylat, 2-methoxyethyl (meth)acrylate, 2-ethoxyethyl (meth)acrylate, 2-butoxyethyl (meth)acrylate, 2-(2-ethoxyethoxy)ethyl (meth)acrylate, tetrahydrofurfuryl (meth)acrylate, isopropylideneglycerol (meth)acrylate, glycerolformal (meth)acrylate, cyclic trimethylolpropane formal (meth)acrylate, hydroxyethyl (meth)acrylate, glycidyl (meth)acrylate and 4-glycidyloxybutyl (meth)acrylate, 2-(dimethylamino)ethyl (meth)acrylate, 3-(dimethylamino)propyl (meth)acrylate, 2-(diethylamino)ethyl (meth)acrylate, 2-(diisopropylamino)ethyl (meth)acrylate, 2-(tert-butylamino)ethyl (meth)acrylate and (meth)acrylic acid.

Acrylic-based binders of use in the top coat composition may be ones based on monomers containing two or more polymerizable ethylenically unsaturated bonds. Examples of monomers containing two or more polymerizable ethylenically unsaturated bonds include monomers such as 1,2-ethanediol di(meth)acrylate, 1,3-butanediol di(meth)acrylate, 1,4-butanediol di(meth)acrylate, 1,6-hexanediol di(meth)acrylate, 1,3-glycerol di(meth)acrylate, methacrylic anhydride, zinc di(meth)acrylate, and trimethylolpropane tri(meth)acrylate.

These monomers may be combined with other non-acrylic monomers to prepare the desired polymer such as styrene.

The acrylic-based binder may be dispersed or emulsified in water. Appropriate chemical modifications may be performed on the binder to improve water compatibility. The dispersion or emulsion may also comprise surfactants and emulsifiers to provide water compatibility. In addition, further components such as stabilizers, defoamers, dispersing agents and biocides may be present.

The acrylic-based binder dispersion or emulsion preferably has a water content of 45 to 65 wt. %. Any waterborne acrylic-based binder may be used in the top coat composition.

Examples of suitable commercially available acrylic-based binders are: SETAQUA® 6301, SETAQUA® 6302, SETAQUA® 6719, SETAQUA® 6754, SETAQUA® 6756, SETAQUA® 6774, SETAQUA® 6776, SETAQUA® 6781 SETAQUA® ECO 6778, SETAQUA® ECO 6788, SETAQUA® ECO 6794, SETAQUA® ECO 9000, SETAQUA® ECO 9415, UCECRYL® B 1181, UCECRYL® B 3009, UCECRYL® B 3010, UCECRYL® B 3014, UCECRYL® B 3022, UCECRYL® B 3033, UCECRYL® B 746, UCECRYL® B 976, UCECRYL® BMR 47, VIACRYL® SC 6805w/50WA, VIACRYL® SC 6841w/50WA, VIACRYL® VSC 6254w/40WA, VIACRYL® VSC 6265w/40WA, VIACRYL® VSC 6279w/45WA, VISCOPOL™ 9898, VISCOPOL™ ECO 2085 from ALLNEX, PRIMAL™ SF-016 ER, PRIMAL™ P-308, PRIMAL™ MV-24, PRIMAL™ ECO-16, PRIMAL™ AC-339, PRIMAL™ E-357 EF, PRIMAL™ HG-415, PRIMAL™ 928 ER, PRIMAL™ S-920, PRIMAL™ AS-8000, PRIMAL™ EC-1791, PRIMAL™ WDV-3317 E, PRIMAL™ ECO-46, PRIMAL™ SS-521 EF, PRIMAL™ SS-640, PRIMAL™ UC-550 EF, PRIMAL™ 3317 EF, PRIMAL™ AS-8012 CN, PRIMAL™ AS-8012 R, PRIMAL™ AC-285 from Dow.

The top coat composition may comprise at least 30 dry wt % of the binder polymer such as at least 40 dry wt. % of the binder.

The top coat composition may also contain standard additives such as pigments and fillers, thickening agents, dispersants and biocides. Suitable pigments and fillers include titanium dioxide, zinc oxide, aluminium oxide, barium sulphate, carbonates, borates, silica, silicates, heavy metal oxides such as cerium oxide, lanthanum oxide and zirconium oxide, mica, diatomaceous earth and bentonite clay. A preferred filler is barium sulphate.

The fillers preferably constitutes from 1% to 25% by dry weight of the intumescent coating composition.

It is remarkable that the water based top coat of the invention is compatible with water-based epoxy intumescent coating of the invention. Whilst it has previously been shown that a water borne acrylic top coat is compatible with a melamine formaldehyde resin, such a resin has a very different chemistry compared an epoxy resin. A melamine formaldehyde resin contains a large number of amine groups for example, which of course will affect the compatibility to top layer.

We demonstrate in the examples that vinyl acetate based intumescent coatings are incompatible with an acrylic topcoat so compatibility is clearly an issue. It is remarkable that a water borne top coat as defined herein would have good compatibility with a water-borne epoxy intumescent.

The invention will now be described with reference to the following non-limiting examples.

Analytical Methods

General Procedure for Preparation of the Compositions

Components of the intumescent coating composition were mixed on a high-speed dissolver in the indicated parts by weight. The resins were added first and blended at low speed. The additives, intumescent pigments, and fillers were then added and mixed at a high speed until no lumps could be seen. Component A and B were prepared separately. The intumescent pigments, fillers, and additives were present in component A only. The components A and B were mixed in a weight ratio of between 2:1 and 5:1.

The total amount of each component in the coating composition after mixing of components A and B is listed in the table below.

Fire Test

The fire protection test was a vertical plate test following the BS 476 cellulosic heating curve using 2 type K thermocouples on each steel substrate. The substrates were 30×0.6 cm 6 samples were tested at the same time. The test result was recorded as the time in minutes before the steel substrate reached the critical core temperature of 550° C.

Determination of Solids Content of the Compositions

The solids content in the compositions are calculated in accordance with ASTM D5201-05.

Calculation of the Volatile Organic Compound (VOC) Content of the Coating Compositions The volatile organic compound (VOC) content of the coating compositions is calculated in accordance with ASTM D5201-05.

Durability Test

Durability was evaluated by comparing fire test results of an exposed sample to the result of an unexposed sample. The exposed samples were placed in a south facing rack for 8 weeks from October to December. After exposure, they were conditioned indoors for 2 weeks before being fire tested.

Curing Time

Curing time was recorded with a Beck and Koller drying time machine, where several stages of the drying time is recorded. The paint sample was applied to glass strips at a standard wet film thickness using a frame applicator. The machine moved one end of a metal bar through the wet paint film, and the machine was programmed to spend 6 or 12 or 24 or 48 hours to move through the length of the drawdown. The curing time was chosen to be the time when the paint no longer showed signs of the steel bar passing through, named as T3 in the non-standard test method.

Appearance of Topcoat Film

The topcoat was applied on top of the intumescent layer according to application guidelines for the topcoat product. The cured film of the topcoat was rated as 1 if there were no visible defects, 2 if there were pinholes, or small cracks on less than 1% of the surface, 3 if there was 1 to 10% cracking, 4 if there was 11 to 60% cracking, or 5 if the surface had more than 60% cracking.

Example 1

The following materials are used:

TABLE 1

| Materials | Description | Properties |
|---|---|---|
| Epoxy-based binder 1[1] | Non-ionic type 1 epoxy dispersion in water, bisphenol A based, n = 1 | 60% in water<br>EEW on solids: 500-600 g/eq.<br>EEW on material as delivered: 750-900 g/eq |
| Epoxy-based binder 2[2] | Flexibilized solid type 1 epoxy dispersion in water | 50-54% in water<br>EEW on solids: 485-550 g/eq.<br>EEW on material as delivered: 900-1100 g/eq. |
| Epoxy-based binder 3[3] | Liquid epoxy resin based on bisphenol A, modified with reactive diluent. | 100% liquid epoxy<br>EEW: 190 g/eq. |
| Amine curing agent 1[4] | Aliphatic polyamine dispersed in water | 44% in water<br>AHEW on solids: 250 g/eq.<br>AHEW on material as delivered: 570 g/eq. |
| Amine curing agent 2[5] | Modified polyamine adduct dissolved in water | 55% in water<br>AHEW on solids: 146 g/eq.<br>AHEW on material as delivered: 265 g/eq |
| Dispersant[6] | Polyethercarboxylate, 35% in water | |
| Coalescing agent[7] | Ester Alcohol | |
| Ammonium polyphosphate | Acid generating compound | |
| Micronised melamine | Expansion agent | |
| Micronized Mono-pentaerytrhitol | Carbon donor | |

[1]Becopox EP2375 from Allnex, [2]Beckopox EP387 from Allnex, [3]Araldite GY776 CH from Huntsman.
[4]Beckcure EH 2100 from Allnex, [5]Aradur 3985 DB from Huntsman, [6]Coadis BR85 from Coatex, [7]Texanol from Eastman.

The compositions prepared are explained in table 2.

TABLE 2

| Part A | | | |
|---|---|---|---|
| | Wt % A1 | Wt % A2 | Wt % A3 |
| Epoxy-based binder 1 (60 wt % in water) | 38.11 | | |
| Epoxy-based binder 2 (50-54 wt % in water) | | 40.07 | |
| Epoxy-based binder 3 (100% liquid epoxy) | | | 23.08 |
| Dispersant (35 wt. % in water) | 0.42 | 0.33 | 0.22 |
| Coalescing agent | 5.75 | 5.57 | 7.17 |
| Ammonium polyphosphate | 27.86 | 27.01 | 34.77 |
| Micronised melamine | 9.29 | 9 | 11.59 |
| TiO$_2$ | 9.29 | 9 | 11.59 |
| Micronised Mono-pentaerytrhitol | 9.29 | 9 | 11.59 |
| Total | 100 | 100 | 100 |
| Water | 15.51% | 19.43% | 0.14% |

| Part B | | | |
|---|---|---|---|
| Type | Wt % B1 | Wt % B2 | Wt % B3 |
| Amine curing agent 1 (44 wt. % in water) | 100% | 100% | |
| Amine curing agent 2 (55 wt. % in water) | | | 100% |
| Water content (wt. %) | 56 | 56 | 45 |

The A and B components were mixed before application in the mixing ratios given in the Table 3 below. The intumescent coating composition was applied to a steel plate on which there is an epoxy primer layer (Muki EPS from Jotun, of thickness 40 to 90 μm). The steel plate was 0.6 cm thick and had dimensions 30×30 cm. The drying time is recorded in Table 3 below.

The two layer system was then subjected to a fire protection test and outdoor exposure test. As a comparison, a commercially available water-based intumescent coating comprising a vinyl-acetate-based binder was used.

TABLE 3

| Property | Description | Formulation C1 | Formulation C2 | Formulation C3 | Commercially available water-borne intumescent based on vinyl-acetate |
|---|---|---|---|---|---|
| Component A and B | | A1:B1 | A2:B2 | A3:B3 | |
| Mixing ratio | A:B | 3.7:1 | 4.4:1 | 3.1:1 | N/A |
| PVC | Calculated | 50 | 50 | 50 | 72 |
| % Volume solids | On 100% formulation | 62.09 | 61.57 | 77.49 | 70 |
| Water content (wt. %) | Total water content in coating composition | 25 | 28 | 11 | 28 |
| Curing time | T3 on drying time recorder, 23° C. | 7 hours | 9.5 hours | 4 hours | 0.5 hours |
| Fire protection | 30 × 30 × 0.6 cm steel plates, Muki EPS Primer, BS 476, TTF 550° C. | 44 minutes @ 0.55 mm DFT | 50 minutes @ 0.94 mm DFT | 54 minutes @ 1.29 mm DFT | 112 minutes @ 0.95 mm DFT |
| Outdoor durability, fire protection retained after outdoor exposure | 8 weeks outdoor exposure, 30 × 30 × 0.6 cm steel plates, Muki EPS Primer, BS 476 TTF 550° C. | 95% | 92% | 74% | 20% |

Example 2

The 2 layer coating system of example 1 was further coated with a top coat composition, Pilot WF from Jotun AS, which is water borne and comprises, inter alfa, an acrylic-based binder. This top coat composition is used commercially in combination with solvent-borne or solvent free intumescent coating compositions but cannot be used in combination with water-borne vinyl acetate based intumescent coatings due to incompatibility issues as shown below. The appearance of the three layer system was evaluated.

TABLE 4

| System properties: | | | | |
|---|---|---|---|---|
| | System 1 | System 2 | System 3 | Comparable System |
| Shop Primer | Epoxy 1 (Muki EPS) | Epoxy 1 (Muki EPS) | Epoxy 1 (Muki EPS) | Epoxy 1 (Muki EPS) |
| Intumescent coating | C1 | C2 | C3 | Commercially available water-borne intumescent based on vinyl-acetate |
| Top coat | Pilot WF | Pilot WF | Pilot WF | Pilot WF |
| Appearance | 1 | 1 | 1 | 5 |

The intumescent coating system of the invention provides a coating system formed from water-based coating formulations which is free of cracks.

The invention claimed is:

1. A process for the application of an intumescent coating system to a substrate comprising
    (I) applying to a substrate an intumescent coating composition comprising
        i. an epoxy-based binder;
        ii. a curing agent;
        iii. an expansion agent;
        iv. an acid generating compound; and
        v. at least 5 wt. % water;
    and allowing said composition to cure to form an intumescent coating layer;
    (II) applying to a cured or partially cured intumescent coating layer, a top coat composition comprising an acrylic-based binder, a polyurethane binder or a silicone-based binder and at least 10 wt. % water so as to form a top coat layer.

2. A process as claimed in claim 1 wherein the substrate to which the intumescent coating composition is applied carries a primer layer such as an epoxy primer layer.

3. A process as claimed in claim 1 wherein the top coat composition comprises an acrylic-based binder.

4. A process as claimed in claim 1 wherein said curing agent is an aliphatic amine or aliphatic polyamine.

5. A process as claimed in claim 1 wherein the intumescent coating composition comprises a carbon donor compound.

6. A process as claimed in claim 5 wherein the carbon donor compound is pentaerythritol, dipentaerythritol, or tripentaerythritol.

7. A process as claimed in claim 1 wherein the acid generating compound is ammonium polyphosphate.

8. A process as claimed in claim 1 wherein the expansion agent is melamine or a melamine derivative.

9. A process as claimed in claim 1 wherein the intumescent coating compositions comprises:
    (i) 10 to 30 dry wt % of at least one epoxy binder;
    (ii) at least one curing agent;
    (iii) 12 to 40 dry wt % an acid-generating compound;
    (iv) 1.0 to 15 dry wt % an expansion agent;
    (v) 1.0 to 15 dry wt % a carbon donor compound; and
    (vi) 10 to 30 wt % water.

10. A process as claimed in claim 1 further comprising allowing said top coat composition to cure.

* * * * *